United States Patent
Li et al.

(10) Patent No.: US 9,935,993 B2
(45) Date of Patent: Apr. 3, 2018

(54) STREAMING VIDEO OVER A HYBRID NETWORK

(71) Applicant: Avago Technologies General IP (Singapore) Pte. Ltd., Singapore (SG)

(72) Inventors: Yong Li, San Diego, CA (US); Xuemin Chen, Rancho Santa Fe, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 311 days.

(21) Appl. No.: 14/734,643

(22) Filed: Jun. 9, 2015

(65) Prior Publication Data

US 2016/0294910 A1 Oct. 6, 2016

Related U.S. Application Data

(60) Provisional application No. 62/141,208, filed on Mar. 31, 2015.

(51) Int. Cl.
| | |
|---|---|
| *H04L 29/06* | (2006.01) |
| *H04N 21/61* | (2011.01) |
| *H04N 21/2665* | (2011.01) |
| *H04N 21/6587* | (2011.01) |
| *H04N 21/2662* | (2011.01) |
| *H04N 21/24* | (2011.01) |
| *H04N 21/442* | (2011.01) |
| *H04N 21/2343* | (2011.01) |
| *H04L 12/801* | (2013.01) |

(52) U.S. Cl.
CPC .......... *H04L 65/607* (2013.01); *H04L 47/10* (2013.01); *H04L 65/1083* (2013.01); *H04L 65/80* (2013.01); *H04L 67/42* (2013.01); *H04N 21/23439* (2013.01); *H04N 21/2402* (2013.01); *H04N 21/2662* (2013.01); *H04N 21/2665* (2013.01); *H04N 21/44209* (2013.01); *H04N 21/6125* (2013.01); *H04N 21/6587* (2013.01)

(58) Field of Classification Search
CPC .... H04L 65/607; H04L 47/10; H04L 65/1083
See application file for complete search history.

(56) References Cited

U.S. PATENT DOCUMENTS

| | | | |
|---|---|---|---|
| 6,426,948 B1 * | 7/2002 | Bowman-Amuah | H04M 3/2254 370/260 |
| 2008/0201748 A1 * | 8/2008 | Hasek | H04N 7/17309 725/98 |
| 2008/0271102 A1 * | 10/2008 | Kienzle | H04N 7/17336 725/115 |

\* cited by examiner

*Primary Examiner* — Arvin Eskandarnia
(74) *Attorney, Agent, or Firm* — Sterne, Kessler, Goldstein & Fox PLLC

(57) ABSTRACT

Systems and methods to deliver streaming video over a hybrid network are provided herein. An adjusted bitrate to transmit video from a server to a client is determined in response to a fast-forward or rewind request. Frames from a video are selectively transmitted to accommodate for the adjusted bitrate based and a bitrate of a connection between the server and the client.

20 Claims, 15 Drawing Sheets

| I DSCP=x | B DSCP=y | B DSCP=y | P DSCP=z | B DSCP=y | B DSCP=y | P DSCP=z | B DSCP=y | B DSCP=y | I DSCP=x |
|---|---|---|---|---|---|---|---|---|---|
| 802-1 | 802-2 | 802-3 | 802-4 | 802-5 | 802-6 | 802-7 | 802-8 | 802-9 | 802-10 |

FIG. 8

STREAMING VIDEO OVER A HYBRID NETWORK

CROSS-REFERENCE TO RELATED APPLICATION

This application claims the benefit of U.S. Provisional Application No. 62/141,208, filed Mar. 31, 2015, which is incorporated herein by reference in its entirety.

FIELD

Embodiments presented herein generally relate to streaming video over a hybrid network.

BACKGROUND ART

Client-based digital video delivery systems, such as TiVo™, typically include a hard drive storing video connected directly to a television or a local network. There are few bandwidth constraints when streaming video over a local network. However, cable operators are planning to provide client-based digital video over hybrid networks. The hybrid networks may include the Internet and other networks such as Data Over Cable Service Interface Specification (DOCSIS) networks. Streaming high quality video over a hybrid network requires high bandwidth for transmission, which may not be available. In addition, when a user engages in "trick-mode" operations (e.g. fast-forward and rewind of the streaming video), the bandwidth requirement to stream the fast-forwarded or rewinded video increases significantly. If the requisite bandwidth is not available, then the video will freeze or drop in quality.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 8 illustrates a stream of packets with markings according to an embodiment that are transmitted by a video server to client device.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
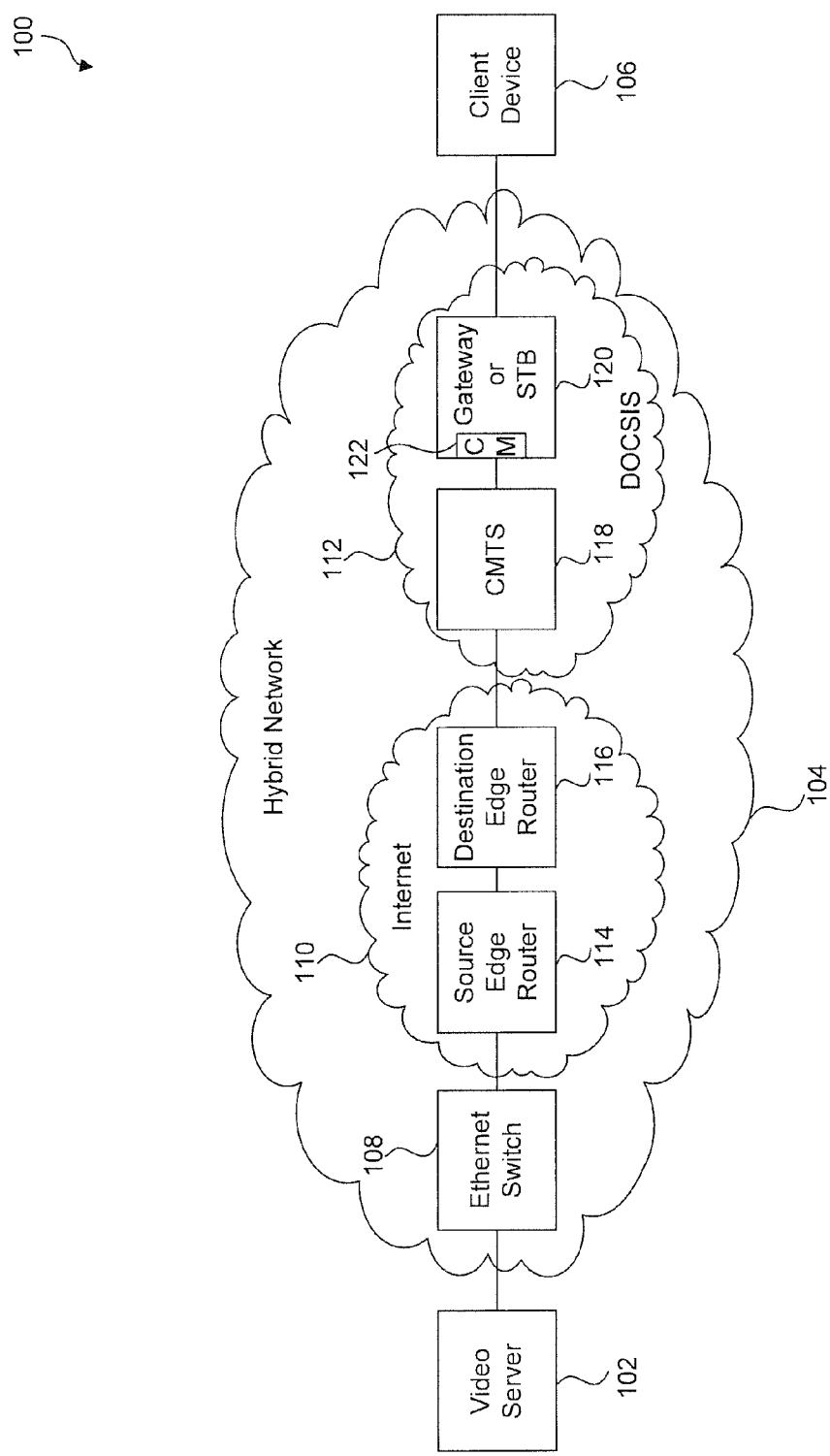
FIG. 1 illustrates an example video delivery system.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Hybrid networks as described herein may include networks that implement one or more communication protocols. Hybrid networks described herein may utilize wired or wireless communication protocols, including for example, the Transmission Control Protocol (TCP), Internet protocol (IP), Data Over Cable Service Interface Specification (DOCSIS), and Wireless Local Area Networks (WLANs) as standardized by the Institute of Electrical and Electronics Engineers (IEEE) in the IEEE 802.11 specification, which is incorporated herein by reference in its entirety. The Internet as referred to herein refers to a network that uses TCP/IP. Exemplary embodiments are not limited to wireless communication networks conforming to the 802.11 specification, and can be used or implemented in one or more other kinds of wireless communication access networks, including (but not limited to), Bluetooth (IEEE 802.15.1 and Bluetooth Special Interest Group), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

Further, exemplary embodiments are not limited to the above wireless communication networks and can be used or implemented in one or more wireless communication networks conforming to one or more 3rd Generation Partnership Project (3GPP) wireless communication protocols and/or to one or more non-3GPP wireless communication protocols. For example, the exemplary embodiments can be configured to utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (Wi-MAX) (IEEE 802.16) to provide some examples.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

System Overview

FIG. 1 illustrates an example video delivery system 100. System 100 includes a video server 102 coupled to a client device via a hybrid network 104. The hybrid network 104 includes an Ethernet switch 108 coupled to the Internet 110. The Internet 110 is coupled to a Data Over Cable Service Interface Specification (DOCSIS) network 112. The Internet includes a source edge router 114 and a destination edge router 116. The DOCSIS network 112 includes a Cable Modem Termination System (CMTS) 118 coupled to a combined cable modem 122. The cable modem may be part of a gateway or set-top box 120 (also referred to as only set-top box 120 herein). The set-top box 120 may include a wired or wireless router (not shown) to communicate with client device 106. The video may be referred to as a video stream or digital video stream. Video server 102 delivers a video stream to the client device 106 via the hybrid network 104. The hybrid network 104 may include other networks besides the Internet 110 and the DOCSIS network 112. In an embodiment, client device 106 requests a video stream from video server 102 via the hybrid network 104.

Figure 2:
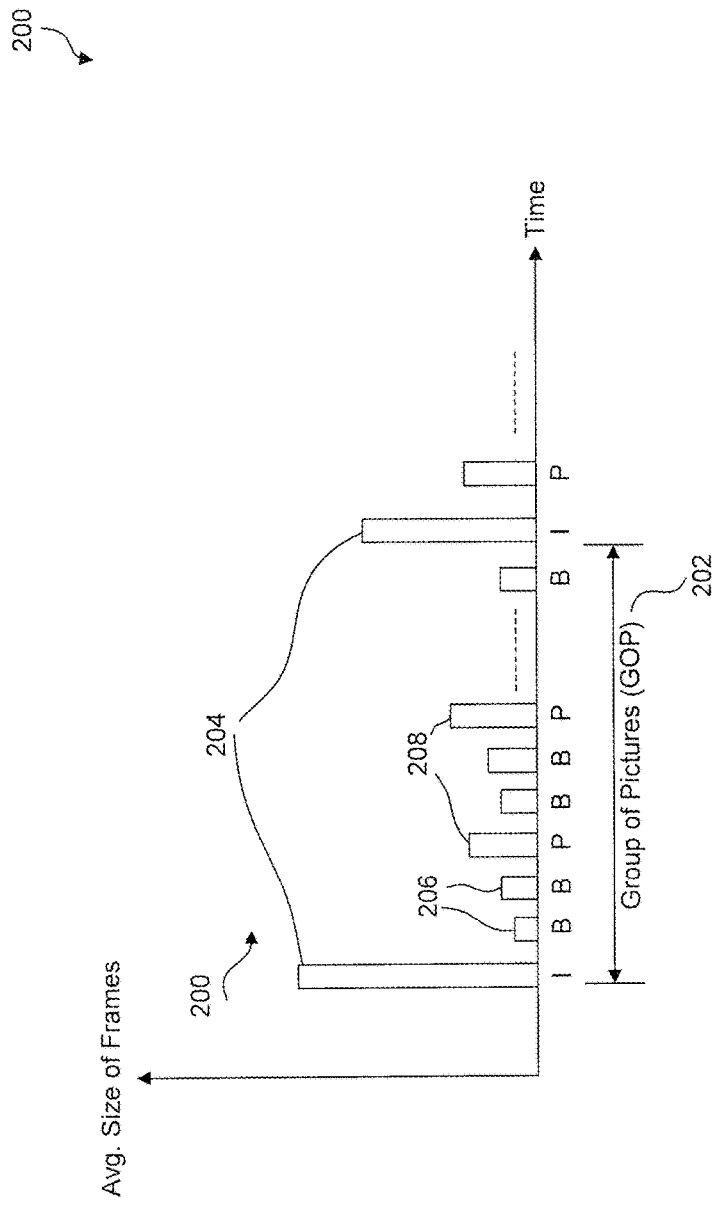
FIG. 2 illustrates an example of a video stream that may be transmitted from a video server to client device.

FIG. 2 illustrates an example of a video stream 200 that may be transmitted from video server 102 to client device 106. Video stream 200 is composed of a series of Group of Pictures (GOPs) 202. Each GOP 202 in turn is composed of a series of Intra-coded (I) frames 204, Bi-directionally predictive (B) frames 206, and Predictive (P) frames 208.

On average, I frames are much larger than P frames, and P frames are much larger than B frames. FIG. 2 illustrates that I frames are approximately twice the size of the P frames, and P frames are approximately twice the size of B-frames. For the latest generation video codec High Efficiency Video Coding (HEVC) and 4k video content, the ratios between I/P frames and between P/B frames are around 3.

I frames are coded without reference to other pictures. Moderate compression is achieved by reducing spatial redundancy, but not temporal redundancy. They can be used periodically to provide access points in the bit stream where decoding can begin. An I frame is in effect a complete picture, like a conventional static image file. P frames and B frames store only part of an image, so they need less space to store than an I frame and thus improve video compression rates. A P frame holds only the changes in the image from the previous frame. For example, in a scene where a car moves across a stationary background, only the car's movements may be encoded in a P frame. An encoder does not need to store the unchanging background pixels in the P frame thereby saving space. P frames are also known as delta-frames. P frames can use the previous I or P frames for motion compensation. Each block in a P frame can either be predicted or intra-coded. By reducing spatial and temporal redundancy, P frames offer increased compression compared to I frames. B frames can be predicted or interpolated from an earlier and/or later frame. A B frame saves even more space than a P frame by using differences between a current frame and both the preceding and following frames to specify its content. For example, B frames use the previous and next I or P frames for motion-compensation, and offer the highest degree of compression. Each block in a B frame can be forward, backward or bi-directionally predicted or intra-coded. To enable backward prediction from a future frame, the coder reorders the pictures from their natural display order to a bit stream order so that the B frame is transmitted after the previous and next frames it references. This introduces a reordering delay dependent on the number of consecutive B frames.

Each GOP 202 is made up of a sequence of various combinations of I, P, and B pictures. It usually starts with an I frame which provides the reference for following P and B frames and identifies the point for switching and tape editing. For example, GOPs 202 may include 15 frames, after which a new I frame starts a sequence of P and B frames. Frames may be coded and decoded in a different order than they are displayed by using bi-directional prediction for B pictures.

Figure 3:
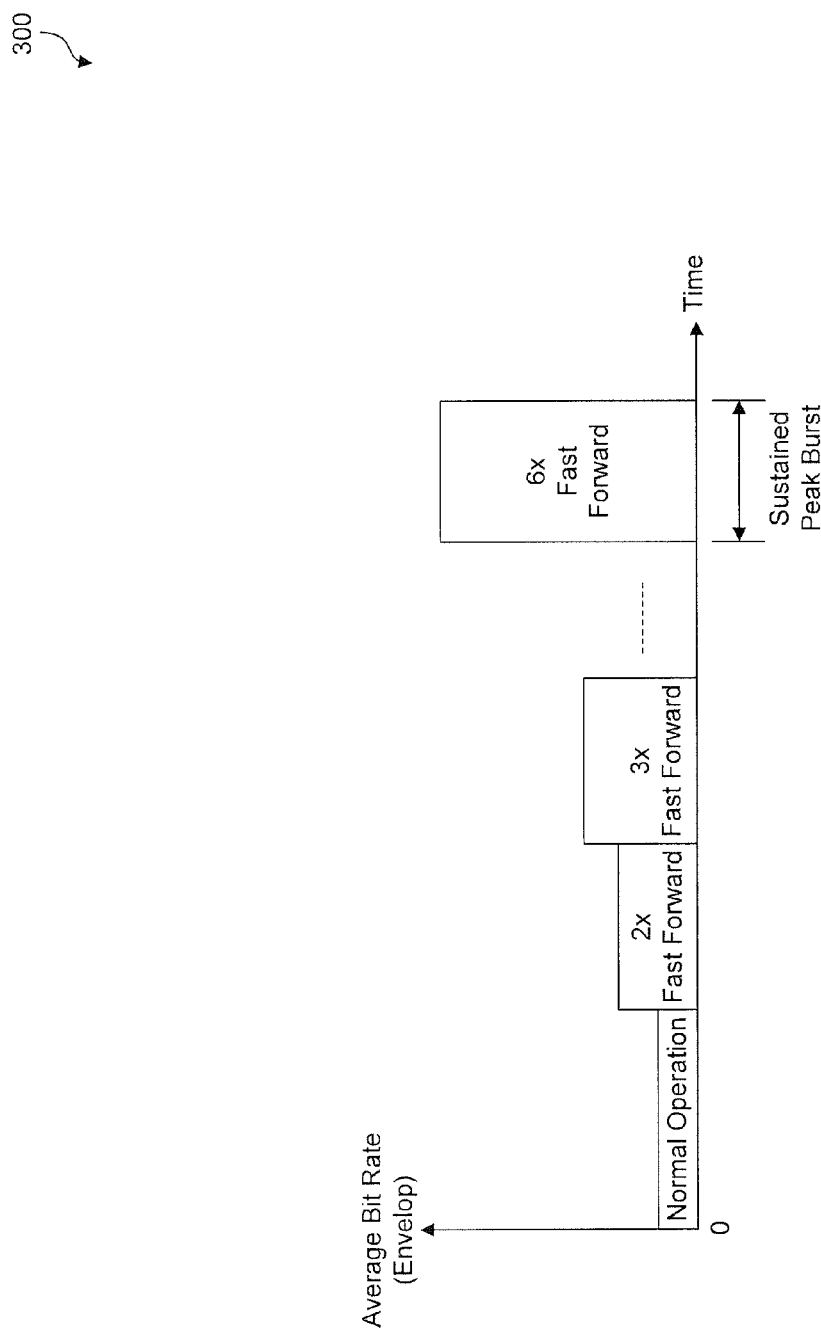
FIG. 3 illustrates average bit rates when fast-forwarding digital video.

FIG. 3 illustrates average bit rates when fast-forwarding digital video. Fast-forwarding or rewinding streaming video may be referred to as "trick-mode" and fast-forwarded and rewinded video may be referred to as "trick-mode video" herein. Video delivered over the Internet or hybrid network may be referred to as "cloud-based" video herein. For cloud-based video delivery services, the trick modes have substantial impact on the characteristics of the video stream. For example, as fast-forward speed increases, more and more B and P frames are skipped in favor I frames that have greater video content. As described above, I frames may be twice the size of P frames and four times the size of B frames. If more I frames need to be transmitted when displaying fast-forwarded video, then the average bit rate increases significantly. In extreme cases, such as a 6× fast forward speed, only I frames may remain in the video stream as P and B frames are completely skipped. As shown in FIG. 3, the average bit rate increases as the fast-forward speed increases. Similarly for rewind operations (not shown), the average bit rate increases as the rewind speed increases. The increase in bit rate ("bursts") when fast-forwarding or rewinding video could result in the video stream stalling while the hybrid network 104 tries to transmit the higher rate video stream to the client device 106. Cloud-based video streaming video may incur sustained bursts during trick mode operations by users. Such bursts will not be mitigated by using more efficient video codecs, such as HEVC, since these codecs do not significantly reduce the sizes of I frames. The impact of sustained bursts will become more severe with the adoption of more bit-rate-intensive video format such as Ultra-High-Definition (Ultra-HD). Ultra-HD television (also known as Super Hi-Vision, UHDTV, or UHD) includes 4K UHD (2160p) and 8K UHD (4320p) video.

Video-streaming services are conventionally provided to the users as over-the-top ("OTT") services. For example, OTT services include Netflix™ and YouTube™. The quality-of-experience for these services is not required to be carrier-grade. For example, Netflix and YouTube transmit a lower quality video stream when there is network congestion resulting in reduced bandwidth between video server 102 and client device 106. However, mainstream TV programming is still not provided over the Internet Protocol (IP). When mainstream TV programming is provided via IP to a massive user-base, first, the volume of video traffic on an IP network will substantially increase. Second, user expectations for video-streaming services will likely match those of traditional digital TV broadcasting. Among the challenges facing a cable operator are Quality of Service (QoS) related issues, which are currently not being addressed. Even during normal operation where the video is not being fast-forwarded or rewinded, unexpected bursts in the video stream require a large amount of bandwidth and can pose a challenge for the configuration of QoS parameters in source edge router 114, destination edge router 115, and CMTS 118, along the data path of transmission in hybrid network 104. Conventional systems end up dropping packets when they encounter a burst of packets in a video stream that cannot be transmitted given the bandwidth available between video server 102 and client device 106.

QoS Control of Streaming Video over a Hybrid Network

Figure 4:
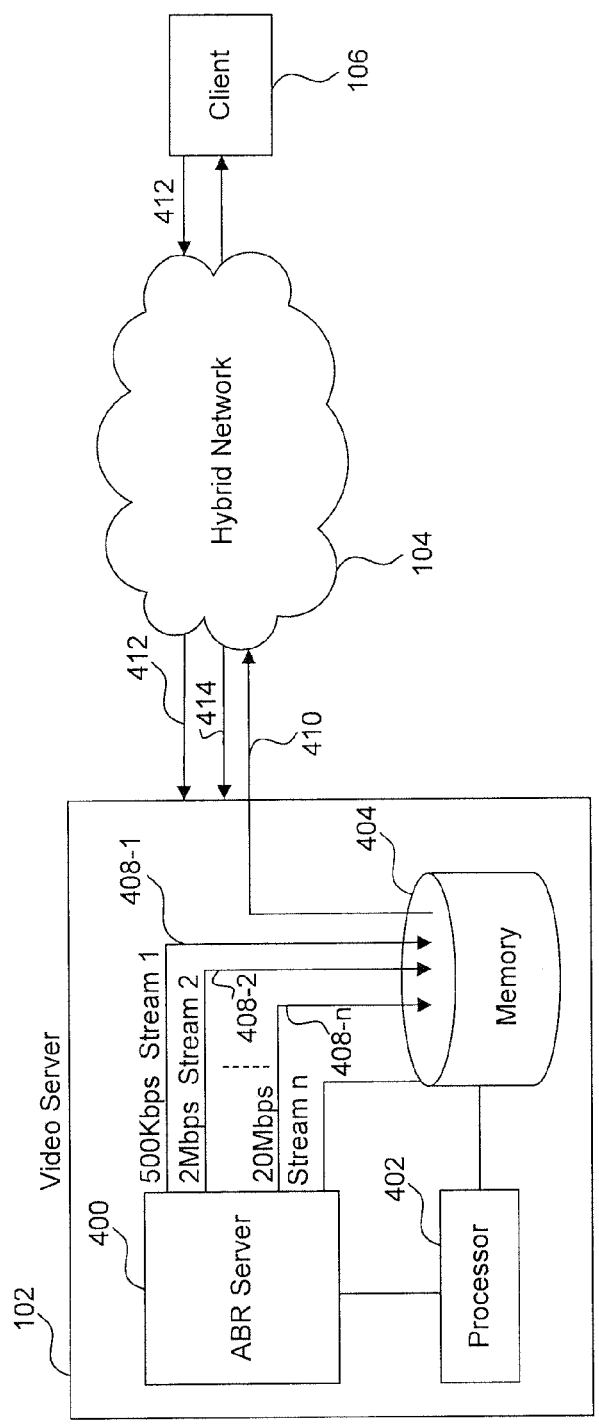
FIG. 4 illustrates an example system for providing video during trick-mode operation.

FIG. 4 illustrates an example system for QoS control of streaming video over a hybrid network according to an embodiment of the disclosure. FIG. 4 illustrates a video server 102 that transmits a video stream 410 to a client device 106 over hybrid network 104. In an embodiment, video server 102 includes an adaptive bit rate (ABR) server 400 coupled to a processor 402 and a memory 404. Memory 404 may include a Random Access Memory (RAM) and/or a storage device such as a hard disk drive.

ABR server 400 encodes and stores copies of a video at different bit rates in memory 404. The copies of videos encoded at different bitrates are represented as video streams 408-1-n. For example, video stream 408-1 is encoded at 500 kbps, video stream 408-2 is encoded at 2 Mbps, and video stream 408-n is encoded at 20 Mbps. When video server 102 receives a request 412 for video from client device 106, it transmits a first video stream, e.g. stream 408-2, encoded at a first rate, e.g. 2 Mbps at which it is encoded, to the client device 106 over the hybrid network 104 via signal 410. The first rate may be based on a bitrate of a connection between the video server 102 and the client device 106 as indicated by feedback signal 414 and/or a service level that a user of the client device 106 has subscribed to.

Client device 106 may, based on a viewer's input, transmit a signal 412 to video server 102 to fast-forward or rewind the first video stream 408 at a specific speed e.g. fast-forward or rewind a video stream 408 at a 5× speed. When video server 102 receives the request via signal 412, it determines an adjusted bitrate of the video that is fast-forward or rewinded based on the requested specific speed. For example, if video server 102 is transmitting a first video stream 408-1 encoded at 2 Mbps, then an adjusted bitrate for a fast-forwarded stream may be, for example, 5 Mbps based on the specific speed (e.g. 5×) for fast-forward or rewind selected by the user. The adjusted bitrate increases when compared to the first bitrate because smaller sized frames such as B frames may be skipped in lieu of bigger sized frames such as I and P frames during fast-forward and rewind. As the requested specific speed increases, more small sized frames such both P and B frames might be skipped in lieu of more I frames being transmitted resulting in an even higher adjusted bitrate. Video server 102 determines whether the adjusted bitrate exceeds a bitrate of the connection between the video server 102 server and the client device 106 as indicated by feedback signal 414. If the adjusted bitrate (e.g. 5 Mbps) does not exceed the bitrate of the connection (e.g. if the bitrate of the connection is 7 Mbps) then video server 102 selectively transmits frames from the first stream 408-2 at the adjusted bitrate of 5 Mbps. For example, video server 102 selectively transfers more I or P frames than B frames from the video stream 408-2 that results in a 5× fast-forward or rewind speed and an adjusted bitrate of 5 Mbps.

If the adjusted bitrate (e.g. 5 Mbps) exceeds the bitrate of the connection (e.g if the birate of the connection is 3 Mbps), then it is determined whether there is a video stream 408 available such that when it is fast-forwarded or rewinded at a 5× speed, the resulting adjusted bitrate it can be supported by the bitrate of the connection (i.e. 3 Mbps). For example, stream 408-1 which is encoded at 500 Kbps when fast-forwarded or rewinded at a 5× speed may result in an adjusted bitrate of 2 mbps that can be supported by the connection rate of 3 Mbps. If no such stream 408 is available, then video server 102 may select a fast-forward or rewind speed (e.g. a 3× speed instead of the originally requested 5× speed) such that when a video stream 408 is fast-forwarded or rewinded at that speed, the resulting adjusted bitrate can be supported by the connection bitrate.

In an embodiment, when fast-forwarding or rewinding, the video server 102 selectively transmits I, P, or B frames, or a combination of I, P, and B frames from a video stream 408. In an example, the video server 102 only transmits I frames from a video stream 408 when the specific speed of fast-forward or rewind exceeds a first threshold, transmits a combination of I frames and P frames from the second stream when the specific speed is below the first threshold and above a second threshold, and transmits a combination of I frames, P frames, and B frames when the specific speed is below a second threshold. For example, if the specific speed of fast-forward or rewind is 10×, then the video server 102 selectively transmits only I frames from the video stream. If the specific speed is below 10× and above 6×, then the video server 102 selectively transmits I and P frames from the video stream. If the specific speed is below 6×, then the video server 102 may transmit a combination of I, P, or B frames.

In an embodiment, the video server 102 locates the I, P, or B frames for transmission from a video stream based on metadata associated with the frames. For example, the metadata associated with the frames in a video stream includes type, size, and location of the frames. In an example, the location of the frames is based on an offset from a first frame of a video stream.

After the fast-forward or rewind operation is over, the video server again transmits the first video stream at the first rate.

Figure 5:
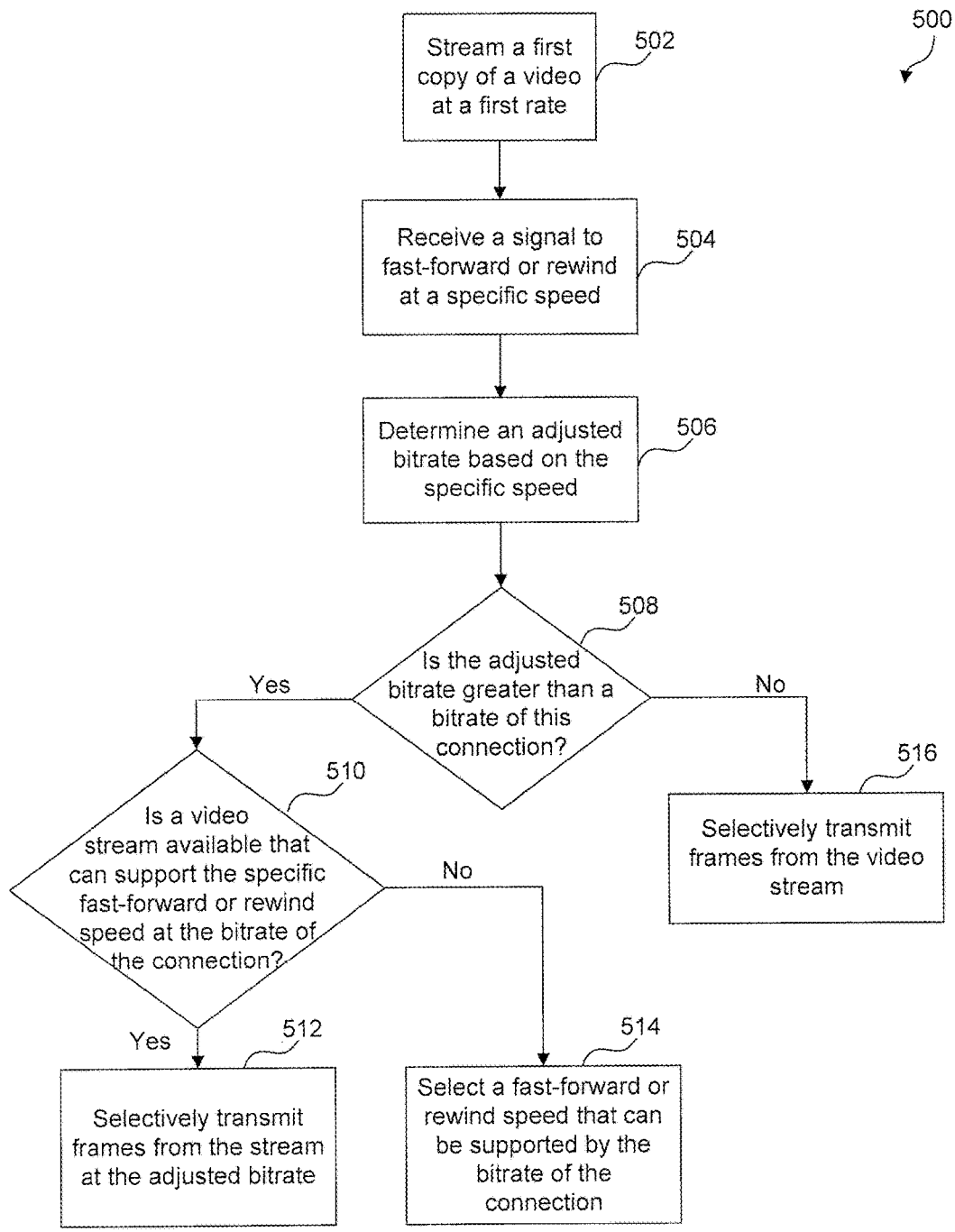
FIG. 5 illustrates an example flowchart illustrating steps to provide Quality of Service (QoS) control for streaming video according to an embodiment of the disclosure.

FIG. 5 illustrates an example flowchart 500 illustrating steps to provide QoS control for streaming video according to an embodiment of the disclosure. Flowchart 500 will be described with continued reference to the example operating environment depicted in FIGS. 1-4. However, the process is not limited to these embodiments. Note that some steps shown in flowchart 500 do not necessarily have to occur in the order shown. In an example, the steps in flowchart 500 are performed by processor 402 based on instructions stored in memory 404.

In step 502, a first video stream is transmitted at a first bitrate based on a bitrate of a connection between a video server and a client device requesting video. For example, video server 102 streams a video stream 408-2 at a first rate (e.g. 2 Mbps) to a client device 106 in response to a request via signal 412 such that the bitrate of the selected video stream 408-2 is less than or equal to a bitrate of a connection between video server 102 and client device 106.

In step 504, a signal is received to fast-forward or rewind the first video stream at a specific speed. For example, a signal 412 is received from client device 106 to fast-forward or rewind the first video stream at the specific speed e.g. a 5× speed.

In step 506, an adjusted bitrate for transmitting the video stream is determined based on the specific speed and the first bitrate. For example, a 2 Mbps video stream fast-forwarded at a 5× speed may result in an adjusted bitrate that is 5 Mbps.

In step 508, it is determined whether the adjusted bitrate (e.g. 5 Mbps) is greater than a bitrate of the connection. For example, video server 102 determines whether the adjusted bitrate (e.g. 5 Mbps) is greater than the rate of the connection between the video server 102 and the client device 106. If it is greater, then the process proceeds to step 510 and if it is lesser, then the process proceeds to step 516. For example, if the rate of the connection is 3 Mbps, then the process proceeds to step 510. If the rate of the connection is 7 Mbps, then the process proceeds to step 516.

In step 516, frames are selectively transmitted from the original video stream from step 502 at the adjusted bitrate. For example, more I or P frames are transmitted from the video stream 408-2 than B frames resulting in the higher adjusted bitrate for the fast-forward or rewind operation.

In step 510, it is determined whether a video stream is available that can support the specific fast-forward or rewind speed at the bitrate of the connection. For example, video server 102 determines whether a video stream 408 is available that can support the specific fast-forward or rewind speed of 5× at a bitrate of the connection which may be, for example, 3 Mbps. If it is available, then the process proceeds to step 512, and if it is not available then the process proceeds to step 514.

In step 512, frames are selectively transmitted from a video stream that can support the specific fast-forward or rewind speed at the bitrate of the connection. For example, video stream 408-1 encoded at 500 Kbps when fast-forwarded at 5× results in a stream with an adjusted bitrate of 2 Mbps that can be transmitted on a 3 Mbps connection.

In step 514, a fast-forward or rewind speed is selected that can support the adjusted bitrate. For example, instead of the 5× speed requested in step 504, a lower speed, e.g. 3×, that can be supported by the bitrate of the connection is selected.

Bandwidth Allocation when Fast-forwarding or Rewinding Video

Figure 6:
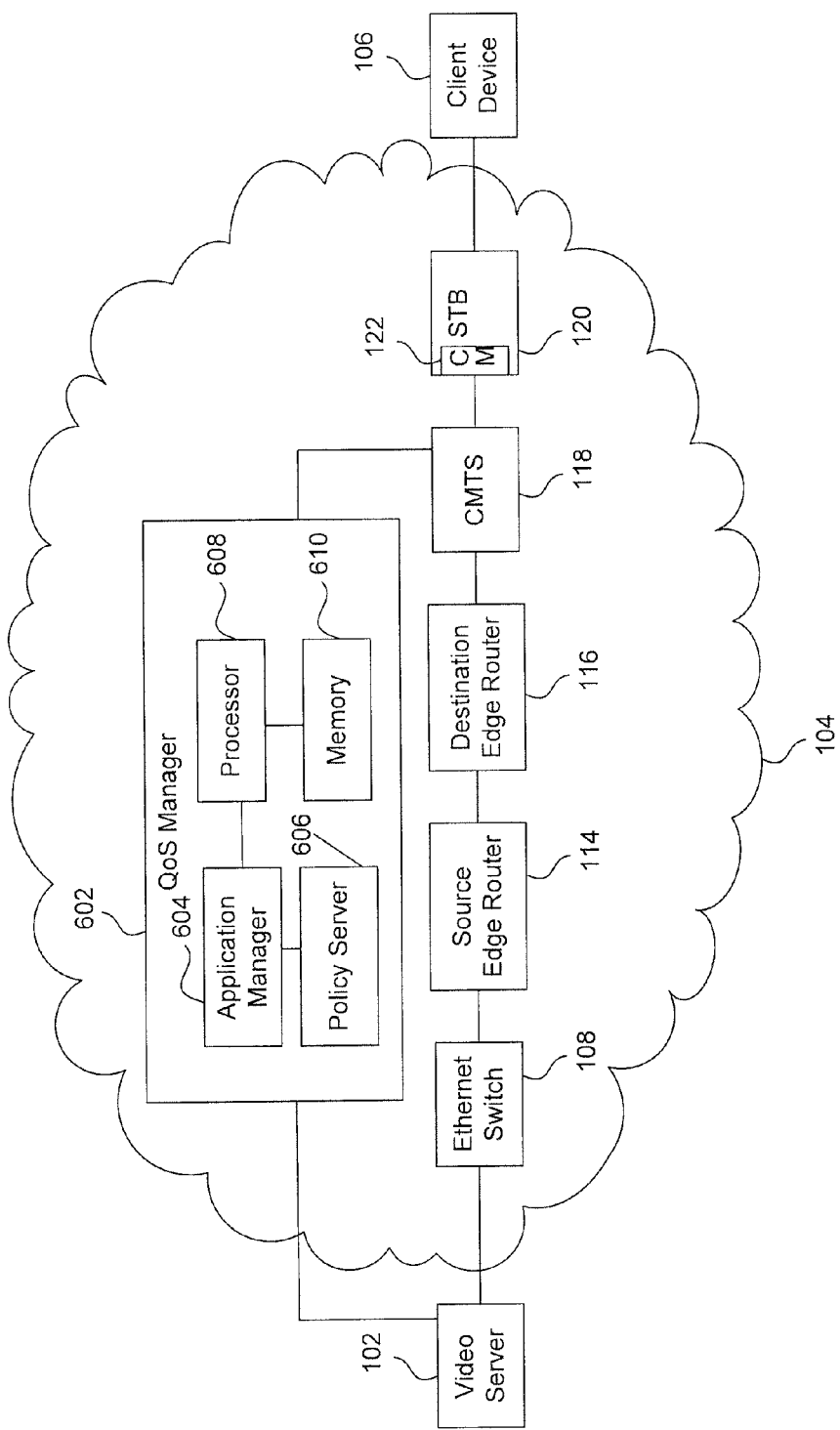
FIG. 6 illustrates an example system for providing increased bandwidth when fast-forwarding or rewinding video.

FIG. 6 illustrates an example system 600 for providing increased bandwidth when fast-forwarding or rewinding video. In addition to the video server 102, Ethernet switch 108, source edge router 114, destination edge router 116, CMTS 118, set-top box 120, and client device 106 described above with respect to FIG. 1, system 600 includes a QoS manager 602 coupled to video server 102 and CMTS 118. QoS manager 602 includes application manager 604 coupled to policy server 606. QoS manager 602 also includes a processor 608 coupled to a memory 610. The functions described herein as being performed by QoS manager 603, application manager 604, and policy server 606 may be performed by processor 608 based on instructions stored in memory 610.

When client device 106 sends a signal to the video server 102 to fast-forward or rewind a video stream transmitted by the video server 102, the fast-forwarded or rewinded video stream will have a higher bitrate than the originally transmitted video stream. This is because during fast-forward and rewind operations, video server 102 will send I-frames that have a large size at a faster rate. A first bitrate of the connection between the CMTS 118 and the set-top box 120 however may not be sufficient to support a second higher bitrate required for the fast-forwarded or rewinded video stream to be transmitted between the CMTS 118 and the set-top box. In conventional systems, a video server 102 transmits the higher rate fast-forwarded or rewinded video stream to the client device 106 without considering the available bandwidth between the CMTS 118 and the set-top box 120. As a result, due to a lack of QoS or bandwidth, the video can stall or freeze until it can be buffered. In applications like Netflix or Youtube, a video server 102 might just send a lower quality of video to the client device 120 during fast-forward or rewind operations. However, if the QoS parameters for the connection between the CMTS 118 and the set-top box 120 can be changed, the higher rate fast-forwarded or rewinded video can be delivered. Applications like TiVo are local to the client device 106 and hence are not affected by the bitrate of the connection between the CMTS 118 and the set-top box 120.

According to an embodiment, when client device 106 requests a fast-forward or rewind operation, it sends a signal to video server 102. In response to the signal, video server 102 determines the second bitrate between the CMTS 118 and the set-top box 120 required to transmit the fast-forwarded or rewinded video stream and sends a first set of QoS parameters to QoS manager 602. The first set of QoS parameters includes an average bitrate, a peak bitrate, a minimum bitrate, or maximum jitter required for the fast-forwarded or rewinded video stream.

In response to the first set of QoS parameters, application manager 604 generates application session data such as a codec used by the video stream, priority level of the video stream, average bitrate, maximum burst size, maximum bitrate, and other Traffic Specification (TSpec) parameters for the fast-forwarded or rewinded video stream. Based on the application session data, the policy server 606 generates a second set of QoS parameters. The second set of QoS parameters includes a Minimum Reserved Rate (MRR), Maximum Sustained Rate (MSR), Maximum Burst Size (MBS), or Peak Rate (PE) for the fast-forwarded or rewinded video stream. QoS manager 602 transmits the second set of QoS parameters to CMTS 118. Based on the second set of QoS parameters, CMTS 118 changes the bitrate of the connection between the CMTS 118 and the set-top box 120 to the second bitrate so that the CMTS 118 can transmit the fast-forwarded or rewinded video stream to the set-top box 120 without the video stalling or freezing. After the fast-forwarded or rewinded video has been transmitted to the set-top box 120, the QoS manager 602 transmits a third set of QoS parameters to the CMTS 118 to change the connection between the CMTS 118 and the set-top box 120 back to the first bitrate.

Figure 7:
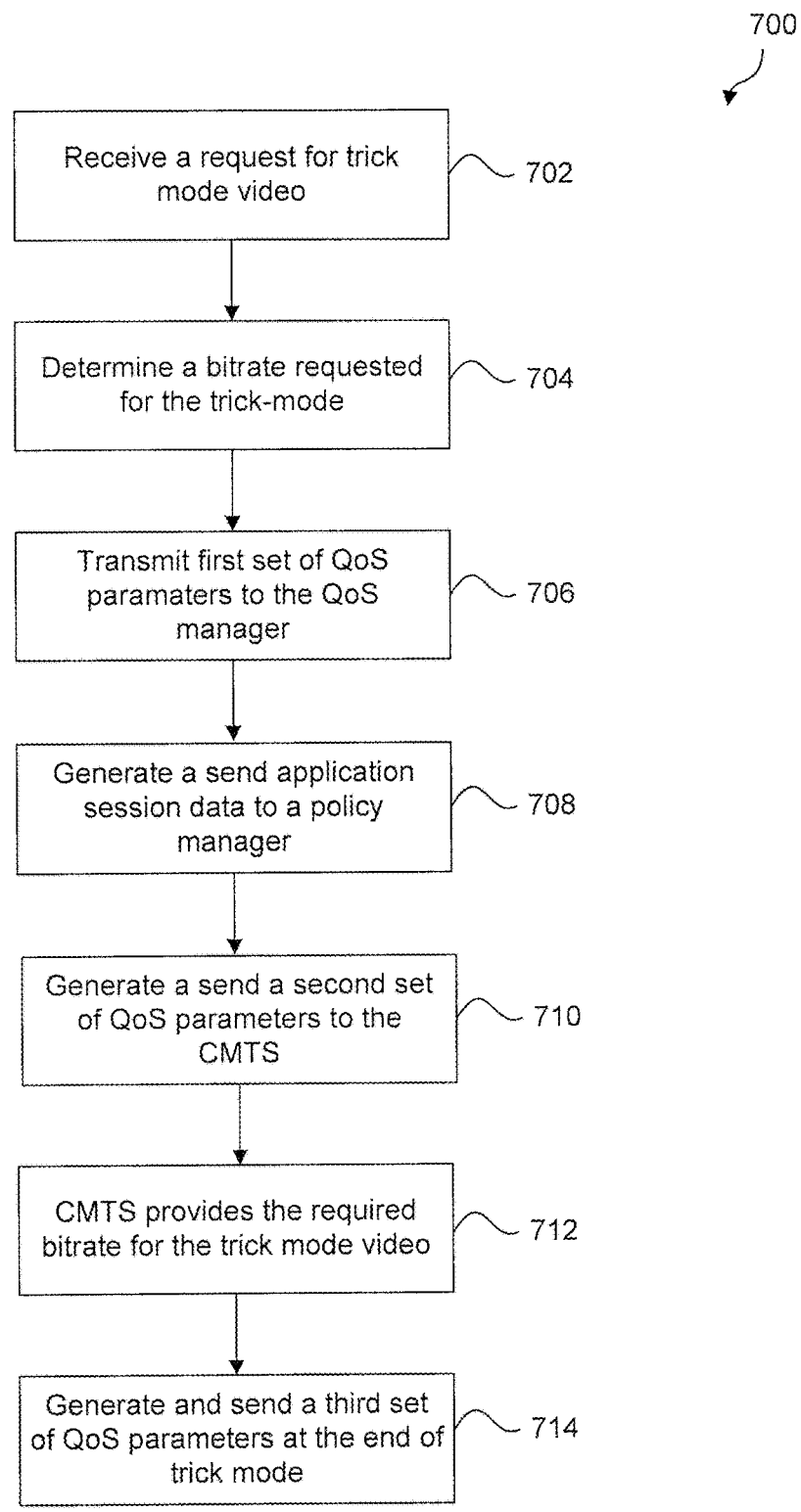
FIG. 7 illustrates an example flowchart illustrating steps to provide QoS control for streaming video according to an embodiment of the disclosure.

FIG. 7 illustrates an example flowchart 700 illustrating steps to provide QoS control for streaming video according to an embodiment of the disclosure. Flowchart 700 will be described with continued reference to the example operating environment depicted in FIGS. 1-6. However, the process is not limited to these embodiments. Note that some steps shown in flowchart 700 do not necessarily have to occur in the order shown. In an example, the steps in flowchart 700 may be performed by one or more of video server 102, processor 402 based on instructions stored in memory 404, QoS manager 602, application manager 602, policy server 606, or processor 608 based on instructions stored in memory 610.

In step 702, a request for trick-mode video is received. For example, video server 102 receives a request for trick-mode video from client device 106.

In step 704, a bitrate required to transmit the trick-mode video is determined. For example, video server 102 determines a bitrate of the connection between CMTS 118 and set-top box 120 required to transmit the trick-mode video.

In step 706, a first set of QoS parameters is generated based on the bitrate determined in step 704. For example, video server 102 generates a first set of QoS parameters based on the bitrate determined in step 704 and transmits the first set of QoS parameters to QoS manager 602.

In step 708, application session data is generated based on the first set of QoS parameters. For example, application manager 604 in QoS manager 602 generates application session data based on the first set of QoS parameters and sends to policy manager 606.

In step 710, a second set of QoS parameters is generated based on the application session data. For example, policy server 606 generates and transmits the second set of QoS parameters to CMTS 118 based on the application session data.

In step 712, based on the second set of QoS parameters, the bitrate determined in step 704 is provided. For example, CMTS 118, implements the second set of QoS parameters, and provides the bitrate determined in step 704 along with other requisite QoS to the connection between the CMTS 118 and the set-top box 120.

In step 714, at the end of the trick-mode request from step 702, a third set of QoS parameters is generated and transmitted. For example, at the end of the trick-mode, the QoS manager 602 generates and transmits a third set of QoS parameters to CMTS 118 to return the bitrate of the connection between the CMTS 118 and the set-top box 120 back to the original bitrate between the CMTS 118 and set-top box 120.

Differential Queuing of Video Frames for Carrier-Grade Video Stream Transmissions in Hybrid Networks Referring back to FIG. 1, video server 102 streams video to client device 106 via hybrid network 104. The video server 102 streams a video to the client device 106 by placing I, P, and B frames of the video in Internet Protocol (IP) packets. The transmission of the streaming video may experience congestion at any point in the network. For example, there may be congestion between Ethernet switch 108 and source edge router 114, between source edge router 114 and destination edge router 116, between destination edge router 116 and CMTS 118, and between CMTS 118 and set-top box 120. Congestion usually occurs due to a drop in available bandwidth. To maintain quality of the video, transmission of I frames needs to be prioritized over transmission of P frames, and transmission of P frames needs to be prioritized over transmission of B frames. This is because I frames contain the most amount of data to display the video. Dropping I frames to avoid congestion will lead the video to stall or result in an unacceptable drop in the quality of the video.

According to an embodiment, video server 102 marks a field in the IP packets to indicate whether the IP packet includes an I, P, or B frame. For example, video server 102 marks a field, for example, a Differentiated Services Code Point (DSCP) field in the header of each IP packet to indicate whether the packet includes an I, P, or B frame. FIG. 8 illustrates a stream of packets 802-1-10 with markings in each packet 802 to indicate a type of frame in the packet. Stream 802-1-10 is transmitted by video server 102 to client device 106. For example, the DSCP fields in packet 802-1 and 802-10 are marked with an "x" to indicate that they each include an I frame. The DSCP fields in packets 802-2-3, 802-5-6, and 802-8-9 are marked with a "y" to indicate that they each include a B frame. The DSCP fields of packets 802-4 and 802-7 are marked with a "z" to indicate that they each include a P frame. It is to be appreciated that other fields and other types of markings can be used to identify types of frames in a packet. These markings are used when for packet classification, queuing, dropping, and scheduling as described below with respect to FIG. 9.

Figure 9:
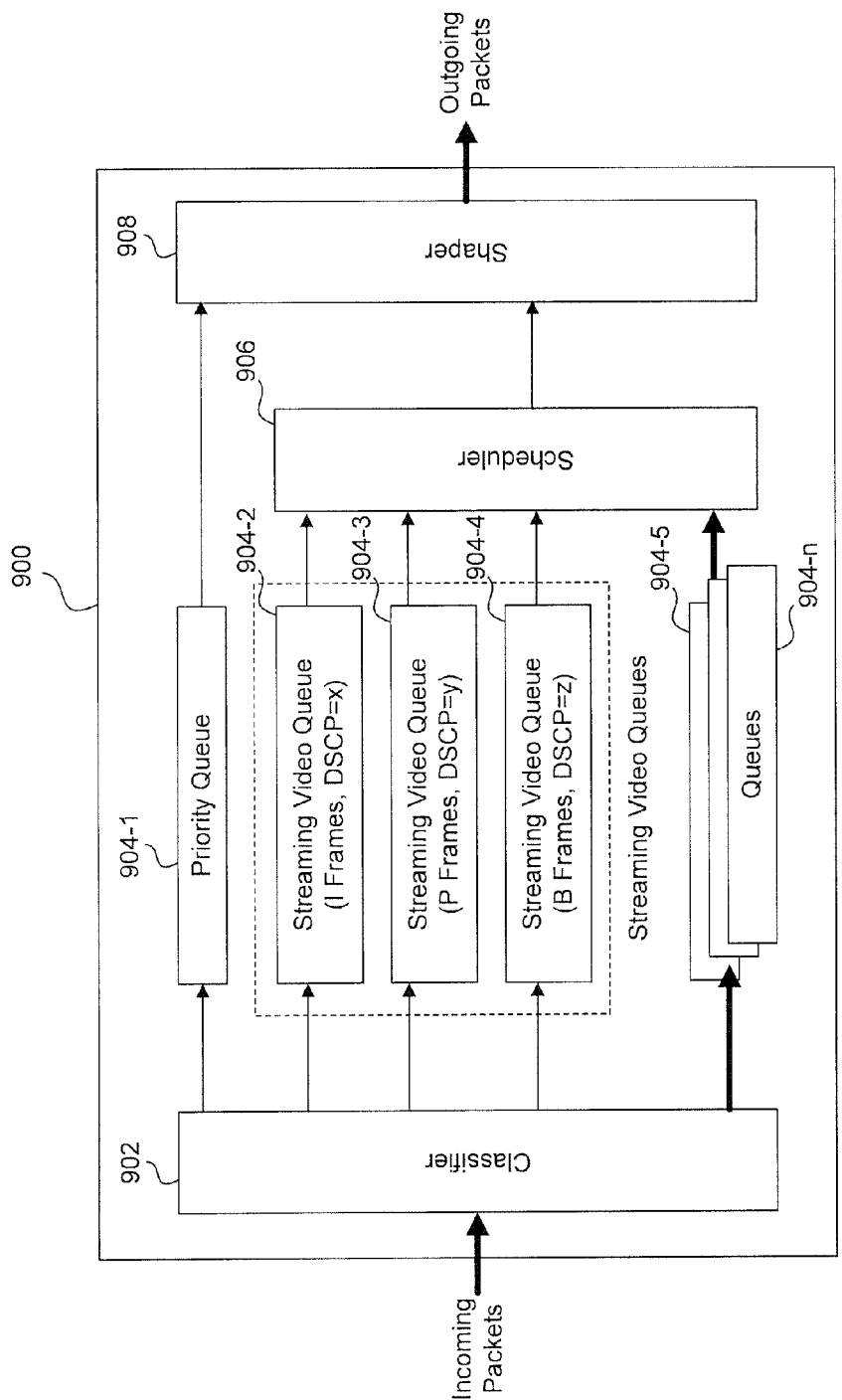
FIG. 9 illustrates an example system for packet classification, queuing, dropping, and scheduling according to an embodiment of the disclosure.

FIG. 9 illustrates an example system 900 for packet classification, queuing, dropping, and scheduling according to an embodiment of the disclosure. System 900 may be part of each of Ethernet switch 108, source edge router 114, destination edge router 116, and CMTS 118. System 900 includes a classifier 902 coupled to queues 904-1-n. A queue as referred to herein is a sequence of packets stored in a memory. Queues 904-1-n are coupled to scheduler 906. Scheduler 906 is coupled to shaper 908. Queues 904 include streaming video queue 904-2 that stores only packets with I frames, streaming video queue 904-3 that stores only packets with P frames, and streaming video queue 904-4 that stores only packets with B frames. System 900 also includes other queues such as queues 904-5-n and priority queue 904-1 to store other packets that do not include video frames. For example, queues 904-5-n may include bulk data queues, call signal queues, and default data queues. Classifier 900 determines which queue 904 to send an incoming packet to and which incoming packets to drop. Scheduler 906 determines a sequence in which packets are transmitted from queues 904. Shaper 908 determines a rate at which packets are transmitted from queues 904.

Classifier 902 stores an incoming packet in a respective queue 904 based on the DSCP field in the packet that indicates the type of video frame in the packet. For example, classifier 902 stores packets marked with an "x" in streaming video queue 904-2, packets marked with a "y" in streaming video queue 904-3, and packets marked with a "z" in streaming video queue 904-4. Each queue 904-2-4 is configured according to the QoS parameters specific to the type of frame that they are storing. The QoS parameters may be minimum, average, and maximum bitrate for each queue. The minimum, average, and maximum bitrate for a queue indicates respective minimum, average, and maximum bitrates at which scheduler 906 has to transmit data from the queue. Streaming video queue 904-2 that stores packets with I-frames has a higher minimum, average, and maximum transmission bitrate than streaming video queue 904-3 that stores P frames, and streaming video queue 904-3 has a higher minimum, average, and maximum transmission bitrate than streaming video queue 904-4 that stores B frames. For example, streaming video queue 904-2 that stores I frames is allocated with the minimum bitrate of 50 Mbps, an average bitrate 70 Mbps, and a maximum bitrate of 100 Mbps. Streaming video queue 904-3 that stores P frames may be allocated a minimum bitrate of 30 Mbps, average bitrate of 50 Mbps, and a maximum bitrate of 70 Mbps. Streaming video queue 904-4 that stores B frames may be allocated a minimum bitrate 10 Mbps, an average bitrate of 20 Mbps, and a maximum bitrate of 30 Mbps. Scheduler 906 and shaper 908 determine which packets to select for transmission based on the minimum, maximum, and average bitrate associated with a queue 904.

Figure 10:
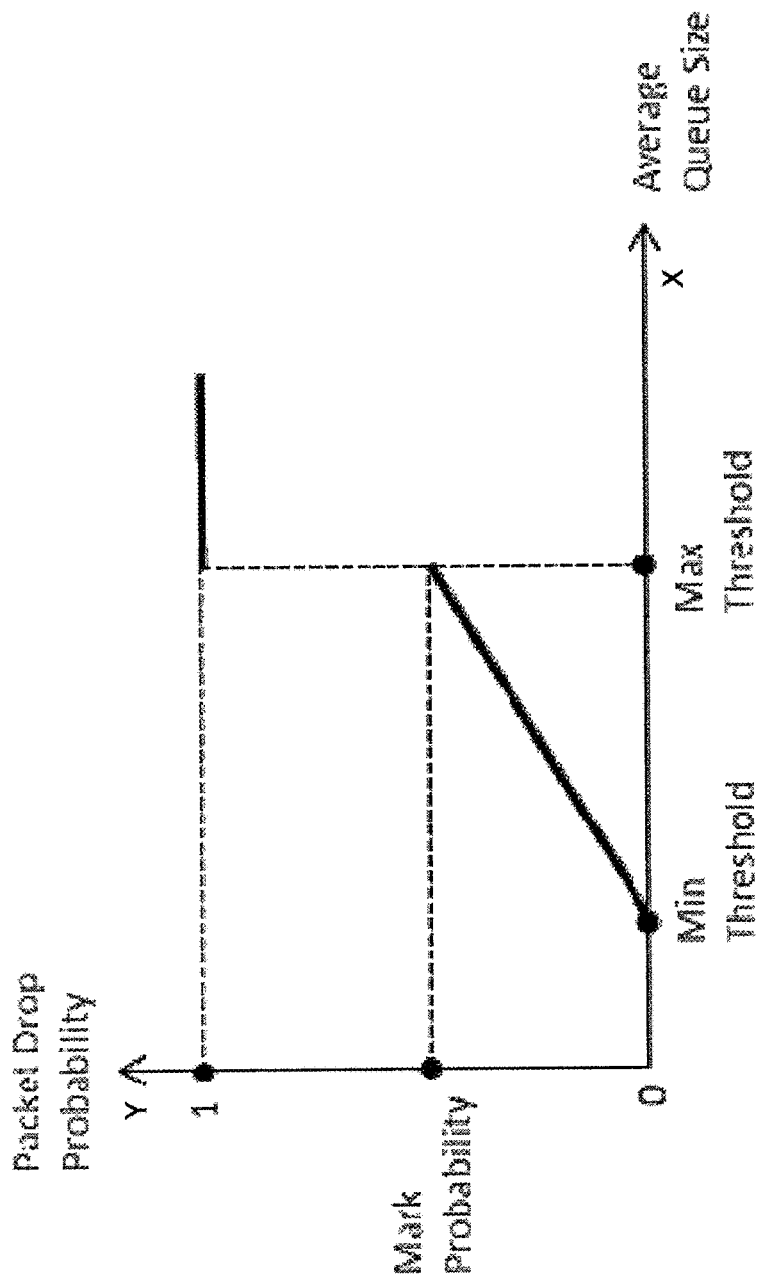
FIG. 10 illustrates weighted random early detection (WRED) packet drop probability according to an embodiment of the disclosure.

In addition to the allocation of minimum, maximum, and average bitrates, each queue 904-4 may also implement Weighted Random Early Detection (WRED) instead of conventional "tail-drop" mechanisms where packets from a tail of a queue are dropped when congestion is detected. In contrast, WRED drops the packets according to a probability of a packet drop that is calculated based on an average size of the queue. The probability of dropping a packet is determined by three configurable parameters: the minimum threshold (also known as minimum queue depth threshold), maximum threshold (also known as maximum queue depth threshold), and a mark probability. Other thresholds can be used. FIG. 10 illustrates WRED packet drop probability. The X-axis is the average queue depth and the Y-axis is the probability of dropping an incoming packet to the queue. If the average queue size (i.e. the average number of packets in the queue) is lower than the minimum threshold, no incoming packet to the queue is dropped. If the average queue size exceeds the maximum threshold, then all incoming packets to the queue are dropped. As seen in FIG. 10, if the average queue size is between the minimum and maximum thresholds, then the incoming packet is dropped according the linearly increasing probability, where the mark probability is the highest probability reached when the average queue size is at the maximum threshold. For example, if the mark probability is 0.2, then 20% of the time the packet might be dropped. If the mark probability is 0.5 then 50% of the time the packet might be dropped. If the market probability is 1, then 100% percent of the time the packet will be dropped. In support of WRED, the minimum threshold and the maximum threshold can be set higher for streaming video queue 904-2 that has I frames than for streaming video queue 904-3 for P frames and streaming video queue 904-4 for B frames. Furthermore, the mark probability can be set lower for streaming video queue 904-2 than for streaming video queue 904-3 and streaming video queue 904-4. This allows different frame types to have different drop thresholds during congestion, with I frames having least probability of being dropped, and P and B frames having a higher probability of being dropped. In an example, P frames have a lower probability of being dropped than B frames.

Even when there is no congestion (i.e. low bandwidth conditions), the present embodiment gives greater priority to transmitting I frames. For example, during trick-mode requests for fast-forwarded and rewinded video where a greater number of I frames need to be transmitted, the above priority queuing system allows priority transmission of I frames over P and B frames, and priority transmission of P frames over B frames. Classifier 902 determines which incoming packet to drop based on the minimum threshold, maximum threshold, and mark probability associated with a queue 904.

Figure 11:
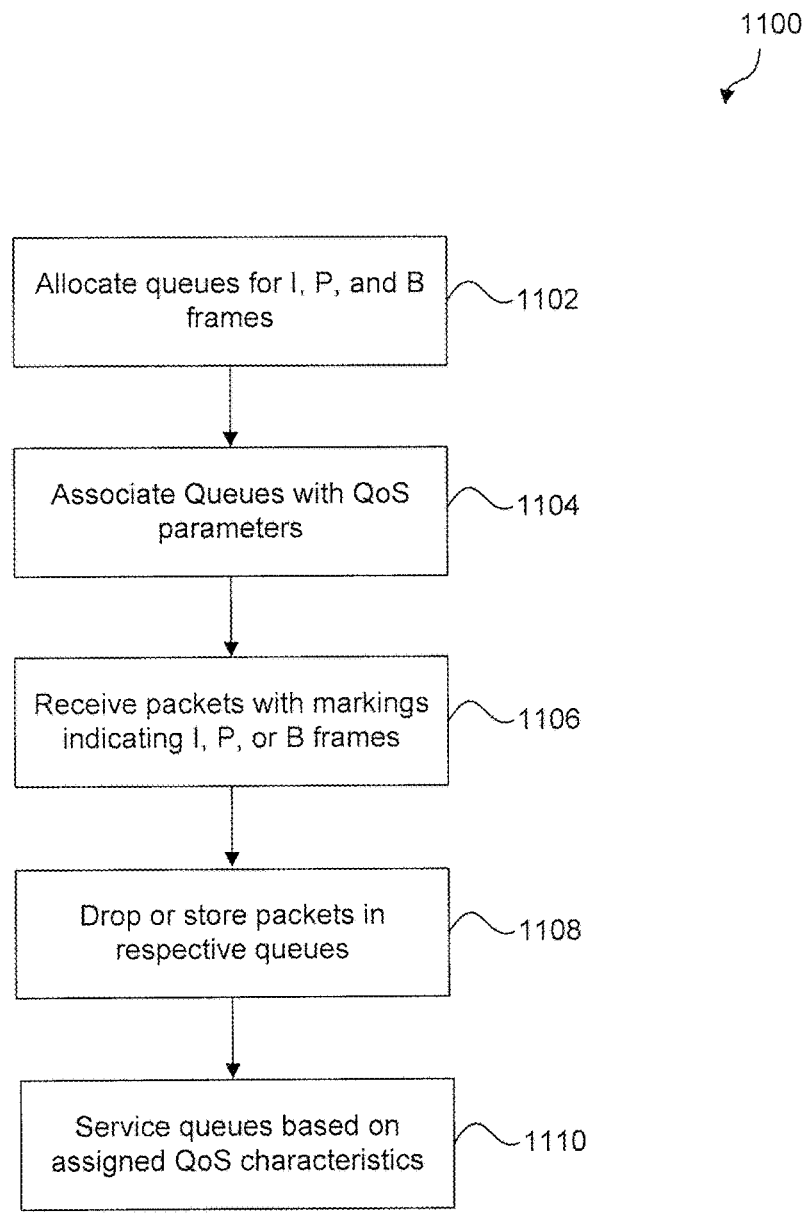
FIG. 11 illustrates an example flowchart illustrating steps for differential queuing and QoS control of streaming video packets according to an embodiment of the disclosure.

FIG. 11 illustrates an example flowchart 1100 illustrating steps for differential queuing and QoS control of streaming video packets according to an embodiment of the disclosure. Flowchart 1100 will be described with continued reference to the example operating environment depicted in FIGS. 1-10. However, the process is not limited to these embodiments. Note that some steps shown in flowchart 1100 do not necessarily have to occur in the order shown. In an example, the steps in flowchart 1100 may be performed by one or more of video server 102, Ethernet switch 108, source edge router 114, destination edge router 116, and CMTS 112.

In step 1102, queues are provisioned to store packets with I, P, or B frames. For example, streaming video queue 904-2 is provisioned to store packets with I frames, streaming video queue 904-3 is provisioned to store packets with P frames, and streaming video queue 904-4 is provisioned to store packets with B frames.

In step 1104, each of the provisioned queues is associated with corresponding QoS characteristics. For example, each of streaming queues 904-2-4 is associated with respective minimum transmission rate, average transmission rate, maximum transmission rate, minimum threshold, maximum threshold, and mark probability.

In step 1106, packets are received with markers identifying whether the packets include I, P, or B frames. For example, a DSCP field in each of the received packets indicates whether a packet includes an I, P, or B frame.

In step 1108, packets are stored in respective queues or dropped based on the markers in the packets and the mark probability, minimum threshold, and maximum threshold associated with the queues.

In step 1110, queues are serviced based on assigned QoS characteristics. For example, as described above, transmission from streaming queue 904-2 is prioritized over transmission from streaming queue 904-3 and transmission from streaming queue 904-3 is prioritized over transmission from streaming queue 904-4 based on minimum transmission rate, maximum transmission rate, and average transmission rate, mark probability, maximum threshold, and minimum threshold.

Distributive Queuing of Critical Video Frames for Carrier-Grade Video Stream Transmissions over Hybrid Networks Referring back to FIG. 1, video server 102 streams video to client device 106 via hybrid network 104. The video server 102 may stream video to the client device 106 by placing I, P, and B frames in Internet Protocol (IP) packets. The transmission of the streaming video may experience congestion at any point in the network. For example, there may be congestion between Ethernet switch 108 and source edge router 114, between source edge router 114 and destination edge router 116, between destination edge router 116 and CMTS 118, and between CMTS 118 and set-top box 120. Congestion usually occurs due a drop in available bandwidth. Congestion may also occur because a client device 106 has requested a trick-mode involving fast-forwarding or rewinding video which results in a burst of I frames. To maintain quality of the video, transmission of I frames needs to be prioritized over transmission of P frames and B frames. This is because I frames contain the most amount of data to display the video. Dropping I frames to avoid congestion will lead the video to stall or an unacceptable drop in the quality of the video. In the example in FIG. 9, only streaming video queue 904-2 is dedicated to storing I frames. In trick-mode where client device 106 requests fast-forwarded or rewinded video, the burst of I frames may be too large since there is only one streaming video queue 904-2 assigned for I-frames, resulting in I frames being dropped.

Figure 12:
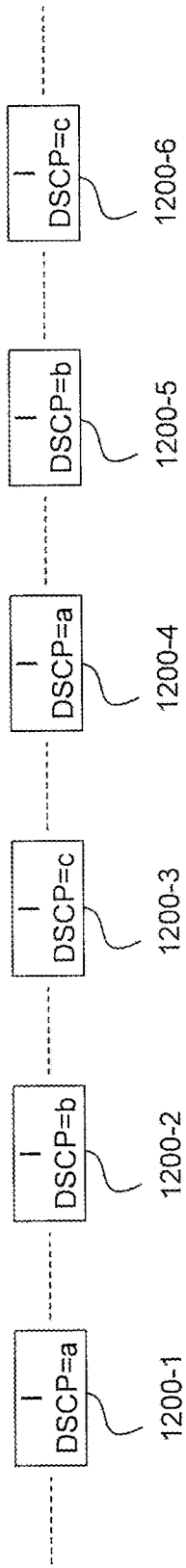
FIG. 12 illustrates a stream of packets with markings according to an embodiment of the disclosure that are transmitted by video server to client device.
Figure 13:
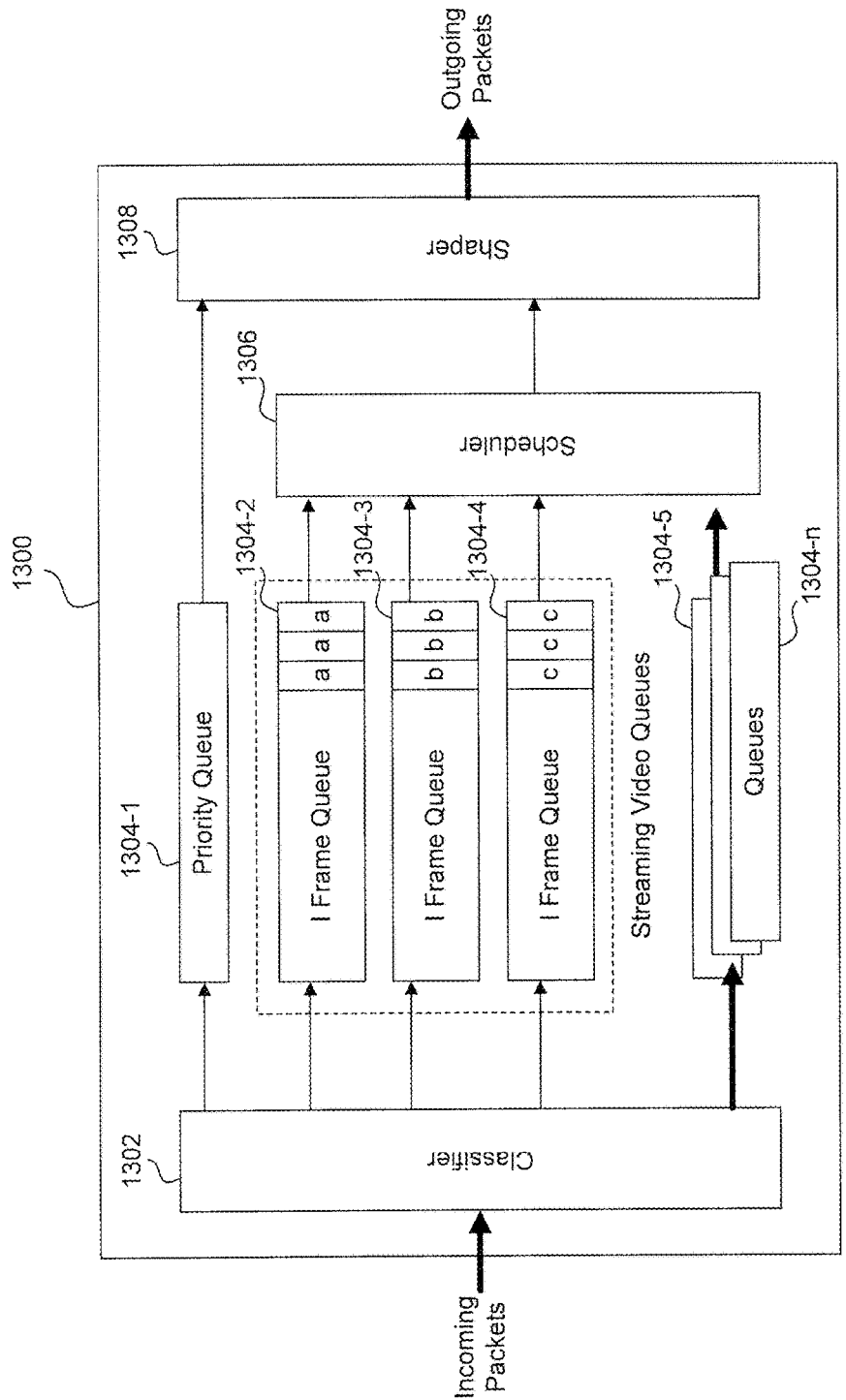
FIG. 13 illustrates an example system for packet classification, queuing, dropping, and scheduling according to an embodiment of the disclosure.

According to an embodiment, video server 102 cyclically marks a field in IP packets that have I-frames. For example, FIG. 12 illustrates a stream of packets 1200-1-6 that are transmitted by video server 102 to client device 106. Video server 102 cyclically marks a field, for example, a DSCP field in the header of each packet that has an I frame with a different marker. In the example, in FIG. 12, there are three markers a, b, and c that are used to cyclically mark packets with I frames. The number of markers depends on the number of queues 1304 that are allocated to I frames as illustrated in FIG. 13. For example, the DSCP field in packet 1200-1 is marked with an "a," in packet 1200-2 is marked with a "b," and in packet 1200-3 is marked with a "c." The video server 102 then again cycles to mark the DSCP field in the next IP packet 1200-4 that has an I frame with an "a," IP packet 1200-5 with a "b," and IP packet 1200-6 with a "c." In an example, video server 102 periodically marks a field in IP packets that have I frames only when client device 106 requests trick-mode video. These markings are used for packet classification, queuing, dropping, and scheduling as described below with respect to FIG. 13.

FIG. 13 illustrates an example system 1300 for packet classification, queuing, dropping, and scheduling according to an embodiment of the disclosure. System 1300 may be part of each of Ethernet switch 108, source edge router 114, destination edge router 116, and CMTS 118. System 1300 includes a classifier 1302 coupled to queues 1304-1-*n*. Queues 1304-1-*n* are coupled to scheduler 306. Scheduler 306 is coupled to shaper 1308. Queues 1304 include streaming video queue 1304-2-4 that stores only packets with I frames. System 1300 also includes other queues such as queues 1304-5-*n* and priority queue 1304-1 to store other packets that do not include video frames. For example, queues 1304-5-*n* may include bulk data queues, call signal queues, and default data queues. Classifier 1302 determines which queue 1304 to send an incoming packet to and which incoming packets to drop. Scheduler 1306 determines a sequence in which packets are transmitted from queues 1304. Shaper 1308 determines a rate at which packets are transmitted from queues 904.

Classifier 1302 stores an incoming packet in one of queues 1304-2-4 based on the DSCP field in the packet that indicates the type of video frame in the packet. For example, classifier 1302 stores an IP packet marked with an "a" in streaming video queue 1304-2, an IP packet marked with a "b" in streaming video queue 904-3, and an IP packet marked with a "c" in streaming video queue 904-4. Each queue 1304-2-4 is configured according to the QoS parameters for I frames. For example, streaming video queues 1304-2-4 that store packets with I frames are provisioned with a higher minimum, average, and maximum transmission bitrate than priority queues 1304-1 and 1304-5-*n*. In addition to the allocation of minimum, maximum, and average bitrates, each of queues 1304-2-4 may also, in support of WRED, be allocated with a minimum threshold, maximum threshold, and mark probability that is greater than a minimum threshold, maximum threshold. and mark probability for priority queues 1304-1 and 1304-5-*n*. Even when there is no congestion (i.e. low bandwidth conditions), the present embodiment gives greater priority to transmitting I frames. For example, during trick-mode requests for fast-forwarded and rewinded video where a greater number of I frames need to be transmitted, the above priority queuing system prevents I frames from being dropped since there are three queues 1304-2-4 allocated to I frames. In the present embodiment, there are only three queues 1304-2-4 allocated to I frames. It is to be appreciated that the number of queues 1304 allocated to I frames is a design choice and may vary.

Figure 14:
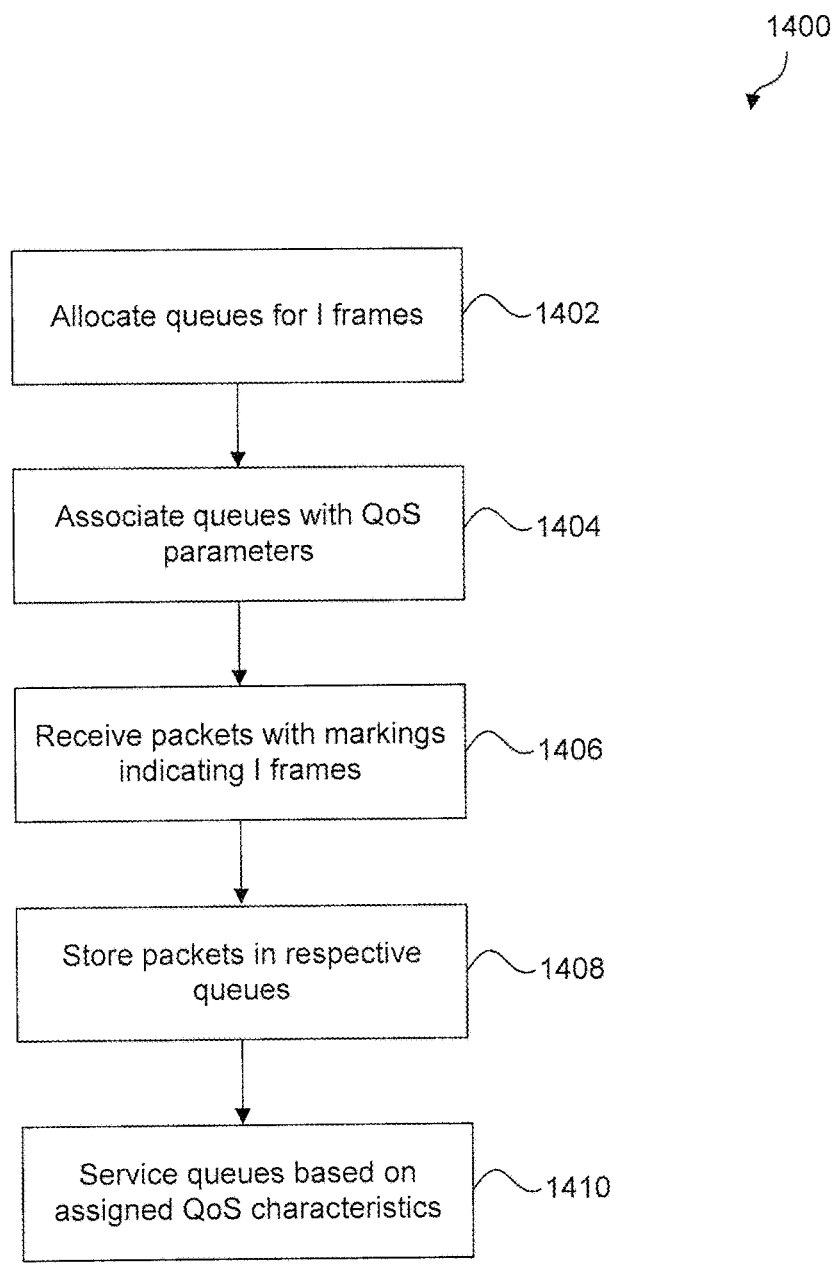
FIG. 14 illustrates an example flowchart illustrating steps for differential queuing and QoS control of streaming video packets according to an embodiment of the disclosure.

FIG. 14 illustrates an example flowchart 1400 illustrating steps for differential queuing and QoS control of streaming video packets according to an embodiment of the disclosure. Flowchart 1400 will be described with continued reference to the example operating environment depicted in FIGS. 1-13. However, the process is not limited to these embodiments. Note that some steps shown in flowchart 1400 do not necessarily have to occur in the order shown. In an example, the steps in flowchart 1400 may be performed by one or more of video server 102, Ethernet switch 108, source edge router 114, destination edge router 116, and CMTS 112.

In step 1402, queues are provisioned to store packets with I frames. For example, streaming video queue 1304-2 is provisioned to store packets with I frames that have a marking "a," streaming video queue 1304-3 is provisioned to store packets with I frames that have a marking "b," and streaming video queue 1304-4 is provisioned to store packets with I frames that have a marking "c."

In step 1404, each of the provisioned queues is associated with corresponding QoS characteristics. For example, each of streaming queues 1304-2-4 is associated with a respective minimum transmission rate, average transmission rate, maximum transmission rate, minimum threshold, maximum threshold, and mark probability.

In step 1406, packets are received with markers identifying I frame packets with markings "a," "b," or "c." For example, a DSCP field in the received packets indicates whether a packet includes an I frame with a marking of either "a," "b," or "c."

In step 1408, packets are stored in respective queues based on the markers in the packets. For example, I frame packets with marker "a" are stored in streaming video queue 1304-2, I frame packets with marker "b" are stored in streaming video queue 1304-3, and I frame packets with marker "c" are stored in streaming video queue 1304-4

In step 1410, queues are serviced based on assigned QoS characteristics. For example, as described above, transmission from streaming queues 1304-2-4 is prioritized over transmission from queues 1304-1 and 1304-5-*n* based on a minimum transmission rate, maximum transmission rate, average transmission rate, mark probability, maximum threshold, and minimum threshold associated with the queues 1304.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 15:
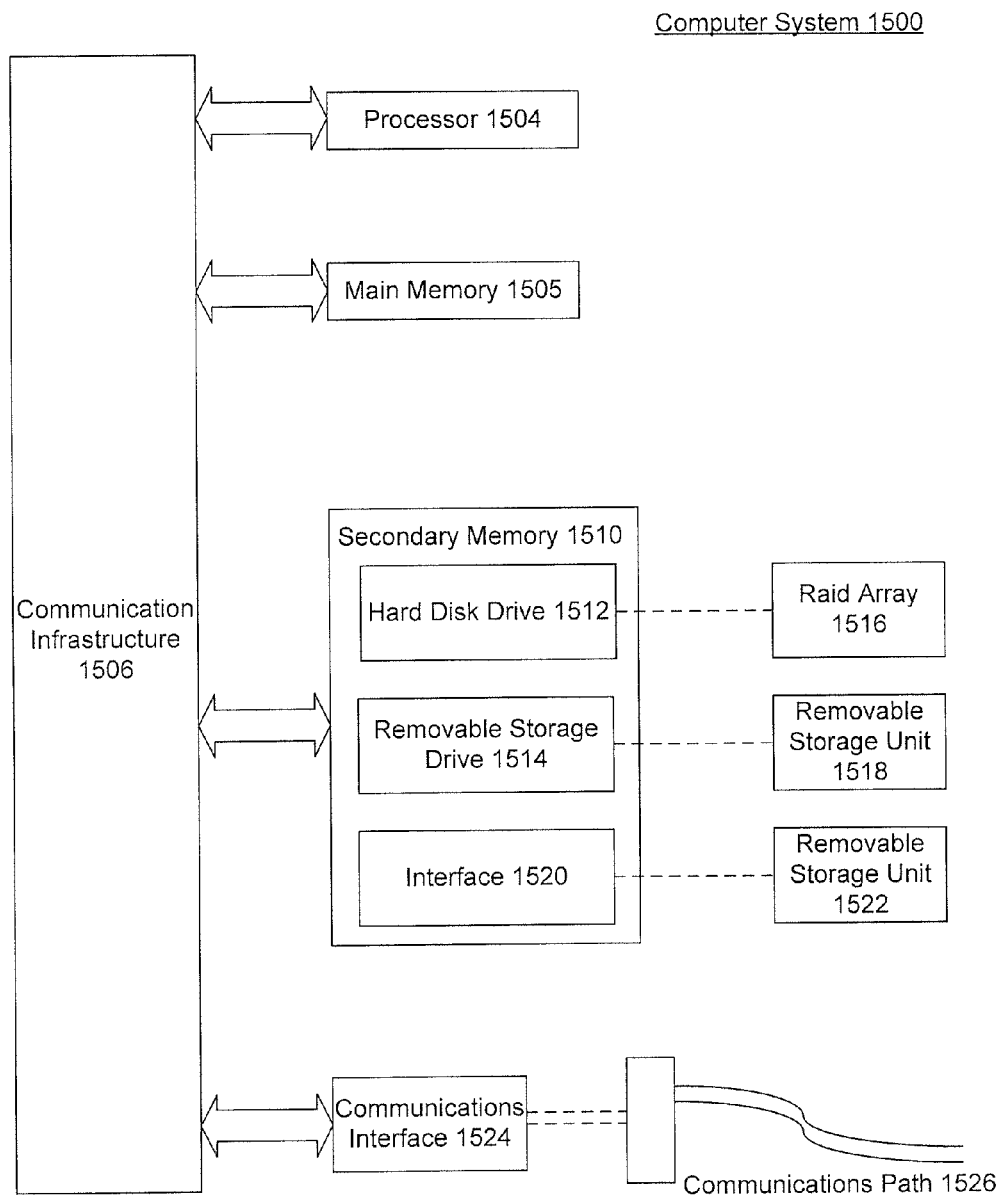
FIG. 15 illustrates and example computer system on which embodiments presented herein may be implemented.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 1500 is shown in FIG. 15. The computer system 1500 includes one or more processors, such as processor 1504. Processor 1504 can be a special purpose or a general-purpose digital signal processor. The processor 1504 is connected to a communication infrastructure 1506 (for example, a bus or network). Various software implementations are described in terms of this exemplary computer system. After reading this description, it will become apparent to a person skilled in the relevant art how to implement the disclosure using other computer systems and/or computer architectures.

Computer system 1500 also includes a main memory 1505, preferably random access memory (RAM), and may also include a secondary memory 1510. The secondary memory 1510 may include, for example, a hard disk drive 1512, and/or a RAID array 1516, and/or a removable storage drive 1514, representing a floppy disk drive, a magnetic tape drive, an optical disk drive, etc. The removable storage drive 1514 reads from and/or writes to a removable storage unit 1518 in a well-known manner. Removable storage unit 1518 represents a floppy disk, magnetic tape, optical disk, etc. As will be appreciated, the removable storage unit 1518 includes a computer usable storage medium having stored therein computer software and/or data.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software (i.e. instructions) and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a PCMCIA slot and card, etc, that are coupled to a communications path 1526. The communications path 1526 can be implemented using wire or cable, fiber optics, a phone line, a cellular phone link, an RF link and other communications links or channels.

The terms "computer program medium" and "computer usable medium" are used herein to generally refer to media such as removable storage drive 1514, a hard disk installed in hard disk drive 1512, or other hardware type memory. These computer program products are means for providing or storing software (e.g. instructions) to computer system 1500.

Computer programs (also called computer control logic) are stored in main memory 1505 and/or secondary memory 1510. Computer programs may also be received via communications interface 1524. Such computer programs, when executed, enable the computer system 1500 to implement the present disclosure as discussed herein. In particular, the computer programs, when executed, enable the processor 1504 to implement the processes and/or functions of the present disclosure. For example, when executed, the computer programs enable processor 1504 to implement part of or all of the steps described above with reference to the flowcharts herein. Where the disclosure is implemented using software, the software may be stored in a computer program product and loaded into computer system 1500 using raid array 1516, removable storage drive 1514, hard drive 1512 or communications interface 1524.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A video server to provide video over a hybrid network, comprising:
   a memory; and
   a processor coupled to the memory, the processor configured to, based on instructions stored in the memory:
   store a plurality of copies of a video encoded at a plurality of respective bitrates in the memory;
   stream a first copy of the plurality of copies to a client device over the hybrid network based on a bitrate of a connection between the video server and the client device, wherein the first copy is encoded at a first bitrate of the plurality of respective bitrates;
   receive a signal from the client device to fast-forward or rewind the first copy at a specific speed;
   determine an adjusted bitrate required to fast-forward or rewind the video based on the specific speed and the first bitrate;
   determine whether the adjusted bitrate exceeds the bitrate of the connection between the video server and the client device; and
   fast-forward or rewind the video at the specific speed by selectively transmitting a plurality of frames from a second copy of the plurality of copies that is encoded at a second bitrate of the plurality of respective bitrates when the adjusted bitrate exceeds the bitrate of the connection between the video server and the client device, wherein the second bitrate is less than the first bitrate.

2. The video server of claim 1, wherein the processor is further configured to, based on instructions stored in the memory, receive the bitrate of the connection between the video server and the client device from the hybrid network.

3. The video server of claim 1, wherein the hybrid network includes a Data Over Cable Service Interface Specification (DOCSIS) network and a Transmission Control Protocol (TCP)/Internet Protocol network.

4. The video server of claim 1, wherein the plurality of frames include I frames, P frames, or B frames.

5. The video server of claim 4, wherein the processor is further configured to, based on instructions stored in the memory, select the I frames or the P frames from the second copy for transmission based on metadata associated with the second copy.

6. The video server of claim 5, wherein the metadata includes type, size, and location of the plurality of frames.

7. The video server of claim 6, wherein the type of the plurality of frames is one of an I frame, a P frame, or a B frame.

8. The video server of claim 6, wherein the location of the plurality of frames is based on an offset from a first frame of the second copy.

9. The video server of claim 1, wherein the processor is further configured to, based on instructions stored in the memory, only transmit I frames of the plurality of frames when the specific speed exceeds a first threshold;
transmit a combination of I frames and P frames when the specific speed is below the first threshold; and transmit I frames, P frames and B frames when the specific speed is below a second threshold.

10. The video server of claim 1, wherein the processor is further configured to, based on instructions stored in the memory, transmit the first copy at the first bitrate at the end of the fast-forward or rewind.

11. A method in video server to provide video over a hybrid network, comprising:
    storing a plurality of copies of a video encoded at a plurality of respective bitrates in the memory;
    streaming a first copy of the plurality of copies to a client device over the hybrid network based on a bitrate of a connection between the video server and the client device, wherein the first copy is encoded at a first bitrate of the plurality of respective bitrates;
    receiving a signal from the client device to fast-forward or rewind the first copy at a specific speed;
    determining an adjusted bitrate required to fast-forward or rewind the video based on the specific speed and the first bitrate;
    determining whether the adjusted bitrate exceeds the bitrate of the connection between the video server and the client device; and
    fast-forwarding or rewinding the video at the specific speed by selectively transmitting a plurality of frames from a second copy of the plurality of copies that is encoded at a second bitrate of the plurality of respective bitrates when the adjusted bitrate exceeds the bitrate of the connection between the video server and the client device, wherein the second bitrate is less than the first bitrate.

12. The method of claim 11, further comprising: receiving the bitrate of the connection between the video server and the client device from the hybrid network.

13. The method of claim 11, wherein the hybrid network includes a Data Over Cable Service Interface Specification (DOCSIS) network and a Transmission Control Protocol (TCP)/Internet Protocol network.

14. The method of claim 11, wherein the plurality of frames include I frames, P frames, or B frames.

15. The method of claim 14, further comprising: selecting the I frames or the P frames from the second copy for transmission based on metadata associated with the second copy.

16. The method of claim 15, wherein the metadata includes type, size, and location of the plurality of frames.

17. The method of claim 16, wherein the type of the plurality of frames is one of an I frame, a P frame, or a B frame.

18. The method of claim 16, wherein the location of the plurality of frames is based on an offset from a first frame of the second copy.

19. The method of claim 11, further comprising:
    only transmitting I frames of the plurality of frames when the specific speed exceeds a first threshold;
    transmitting a combination of I frames and P frames when the specific speed is below the first threshold; and
    transmitting I frames, P frames and B frames when the specific speed is below a second threshold.

20. A non-transitory medium having stored thereon executable instructions that, if executed by a computing device, cause the computing device to perform a method, comprising:
    storing a plurality of copies of a video encoded at a plurality of respective bitrates in a memory;

streaming a first copy of the plurality of copies to a client device over a hybrid network based on a bitrate of a connection between a video server and the client device, wherein the first copy is encoded at a first bitrate of the plurality of respective bitrates;
receiving a signal from the client device to fast-forward or rewind the first copy at a specific speed; determining an adjusted bitrate required to fast-forward or rewind the video based on the specific speed and the first bitrate;
determining whether the adjusted bitrate exceeds the bitrate of the connection between the video server and the client device; and
fast-forwarding or rewinding the video at the specific speed by selectively transmitting the plurality of frames from a second copy of the plurality of copies that is encoded at a second bitrate of the plurality of respective bitrates when the adjusted bitrate exceeds the bitrate of the connection between a video server and the client device, wherein the second bitrate is less than the first bitrate.

* * * * *

UNITED STATES PATENT AND TRADEMARK OFFICE
CERTIFICATE OF CORRECTION

PATENT NO. : 9,935,993 B2
APPLICATION NO. : 14/734643
DATED : April 3, 2018
INVENTOR(S) : Li et al.

Page 1 of 1

It is certified that error appears in the above-identified patent and that said Letters Patent is hereby corrected as shown below:

In the Claims

In Column 18, Line 9, replace "in video server" with --in a video server--.
In Column 19, Line 18, replace "a video server" with --the video server--.

Signed and Sealed this
Eighteenth Day of June, 2019

Andrei Iancu
*Director of the United States Patent and Trademark Office*